(12) United States Patent
Watanabe et al.

(10) Patent No.: US 8,908,205 B2
(45) Date of Patent: Dec. 9, 2014

(54) DOCUMENT PROCESSING JOB CONTROL VIA A MOBILE DEVICE

(75) Inventors: Kaoru Watanabe, Sunnyvale, CA (US); Guiluan Luo, Dublin, CA (US); Zhenyu Lu, Sunnyvale, CA (US); Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 405 days.

(21) Appl. No.: 13/034,282

(22) Filed: Feb. 24, 2011

(65) Prior Publication Data

US 2012/0218589 A1  Aug. 30, 2012

(51) Int. Cl.
| | |
|---|---|
| *G06F 3/12* | (2006.01) |
| *G06K 15/22* | (2006.01) |
| *C12N 5/071* | (2010.01) |
| *H04B 7/00* | (2006.01) |
| *H04B 1/38* | (2006.01) |

(52) U.S. Cl.
USPC ....... 358/1.15; 358/1.3; 435/372.2; 455/41.2; 455/557

(58) Field of Classification Search
CPC ... G06F 3/1205; G06F 3/1257; G06F 3/1268; G06F 3/1287
USPC ...................................... 358/1.15
See application file for complete search history.

(56) References Cited

U.S. PATENT DOCUMENTS

| | | | |
|---|---|---|---|
| 6,144,997 | A | 11/2000 | Lamming et al. |
| 6,515,988 | B1 | 2/2003 | Eldridge et al. |
| 7,755,788 | B2 | 7/2010 | Corona |
| 2002/0112037 | A1 | 8/2002 | Koss |
| 2003/0081250 | A1 | 5/2003 | Kimura |
| 2003/0117642 | A1 | 6/2003 | Haraguchi |
| 2004/0010431 | A1 | 1/2004 | Thomas et al. |
| 2004/0034654 | A1 | 2/2004 | Simpson et al. |
| 2004/0172621 | A1 | 9/2004 | Guillorit |
| 2005/0134889 | A1 | 6/2005 | Nakazawa |
| 2005/0199699 | A1* | 9/2005 | Sato et al. ................. 235/375 |
| 2005/0223390 | A1 | 10/2005 | Moore |

(Continued)

FOREIGN PATENT DOCUMENTS

EP  2 264 588 A2  12/2010

OTHER PUBLICATIONS

European Patent Office, "European Search Report" in application No. 12166273.8-1228, dated Dec. 12, 2012, 5 pages.

*Primary Examiner* — Douglas Tran
*Assistant Examiner* — Justin Katzwhite
(74) *Attorney, Agent, or Firm* — Hickman Palermo Truong Becker Bingham Wong LLP; Daniel D. Ledesma

(57) ABSTRACT

Techniques are provided for allowing a user to create a document processing job (e.g., a print job, a scan job, a copy job, fax job) at a mobile device instead of at a document processing device, such as a printer, scanner, or copier. A cloud service interacts with the mobile device to retrieve job settings data from the mobile device. The cloud service generates a job identifier, associates the job identifier with job settings associated with the job settings data, and sends the job identifier to the mobile device, which displays the job identifier to the user. The user later enters the job identifier at the document processing device, which, in turn, uses the job identifier to request the job settings from the cloud service. The cloud service identifies the job settings based on the job identifier and sends the job settings to the document processing device.

20 Claims, 5 Drawing Sheets

(56) References Cited

U.S. PATENT DOCUMENTS

| | | |
|---|---|---|
| 2006/0044587 A1 | 3/2006 | Yoshida |
| 2006/0074849 A1 | 4/2006 | Lee |
| 2006/0274361 A1 | 12/2006 | Kobayashi et al. |
| 2007/0019215 A1 | 1/2007 | Yu |
| 2007/0019232 A1 | 1/2007 | Kano |
| 2007/0027894 A1 | 2/2007 | Bridges et al. |
| 2007/0208877 A1 | 9/2007 | Kelley |
| 2007/0220475 A1 | 9/2007 | Asahara |
| 2007/0273925 A1 | 11/2007 | Hong |
| 2008/0081666 A1 | 4/2008 | Masera |
| 2009/0021776 A1 | 1/2009 | Dolan et al. |
| 2009/0024751 A1 | 1/2009 | Taniguchi et al. |
| 2009/0059273 A1 | 3/2009 | Tomita |
| 2009/0116052 A1 | 5/2009 | Matsuzawa |
| 2009/0225172 A1 | 9/2009 | Tsuchiya |
| 2011/0085196 A1* | 4/2011 | Liu et al. ............ 358/1.15 |
| 2012/0050790 A1 | 3/2012 | Hong |
| 2012/0079409 A1 | 3/2012 | Luo et al. |
| 2013/0021643 A1 | 1/2013 | Nuggehalli et al. |

* cited by examiner

DOCUMENT PROCESSING JOB CONTROL VIA A MOBILE DEVICE

CROSS-REFERENCE TO RELATED APPLICATIONS

This application claims is related to application Ser. No. 12/872,829, filed Aug. 31, 2010 and to application Ser. No. 12/892,155, filed Sep. 28, 2010 the entire contents of both of which are hereby incorporated by reference as if fully set forth herein.

FIELD OF THE INVENTION

The present invention relates to allowing a smart phone (or mobile device) to create a document processing job and allowing a document processing device (e.g., printer/scanner/copier) to process that document processing job.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multi-functional peripherals (MFPs) are devices that provide multiple functions to users. Typically, such functions comprise printing, scanning, copying, and faxing. One conventional technique for employing an MFP in the scan context is for a user to manually enter a username and password via a display (either graphical, non-graphical, or a combination thereof) of the MFP, place one or more printed documents on a screen of the MFP, and select a scan button on the MFP. Because the MFP is a device that multiple people use and for which usage details are typically desired (e.g., for billing purposes), a user must be registered with the MFP and each registered user must input his/her own username and password in order to complete a, for example, print job, scan job, or copy job. Manually entering a username and password for each print, scan, or copy job can be laborious and error-prone. Another disadvantage to MFPs is that user interfaces of MFPs tend not to be user-friendly or visually appealing.

SUMMARY

Techniques are provided for creating a document processing job through a mobile device. A cloud service receives job settings data from the mobile device. The job settings data is associated with one or more job settings for a document processing job. In response to receiving the job settings data, the cloud service determines a job identifier, associates the job identifier with the one or more job settings, and sends the job identifier to the mobile device. After sending the job identifier to the mobile device, the cloud service receives the job identifier from a document processing device, identifies the one or more job settings based on the job identifier, and sends the one or more job settings to the document processing device. The document processing device, in turn, processes one or more documents based on the job settings data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. DOCUMENT PROCESSING JOB ARCHITECTURE
 A. CLOUD
 B. MOBILE DEVICE
 C. MFP
 D. OPERATION PANEL
III. CREATING A DOCUMENT PROCESSING JOB
IV. RESTRICTIONS ON DOCUMENT PROCESSING DEVICES
V. WORKFLOWS
VI. LEVERAGING INFORMATION ON A MOBILE DEVICE
VII. IMPLEMENTATION MECHANISMS

I. Overview

Figure 1:
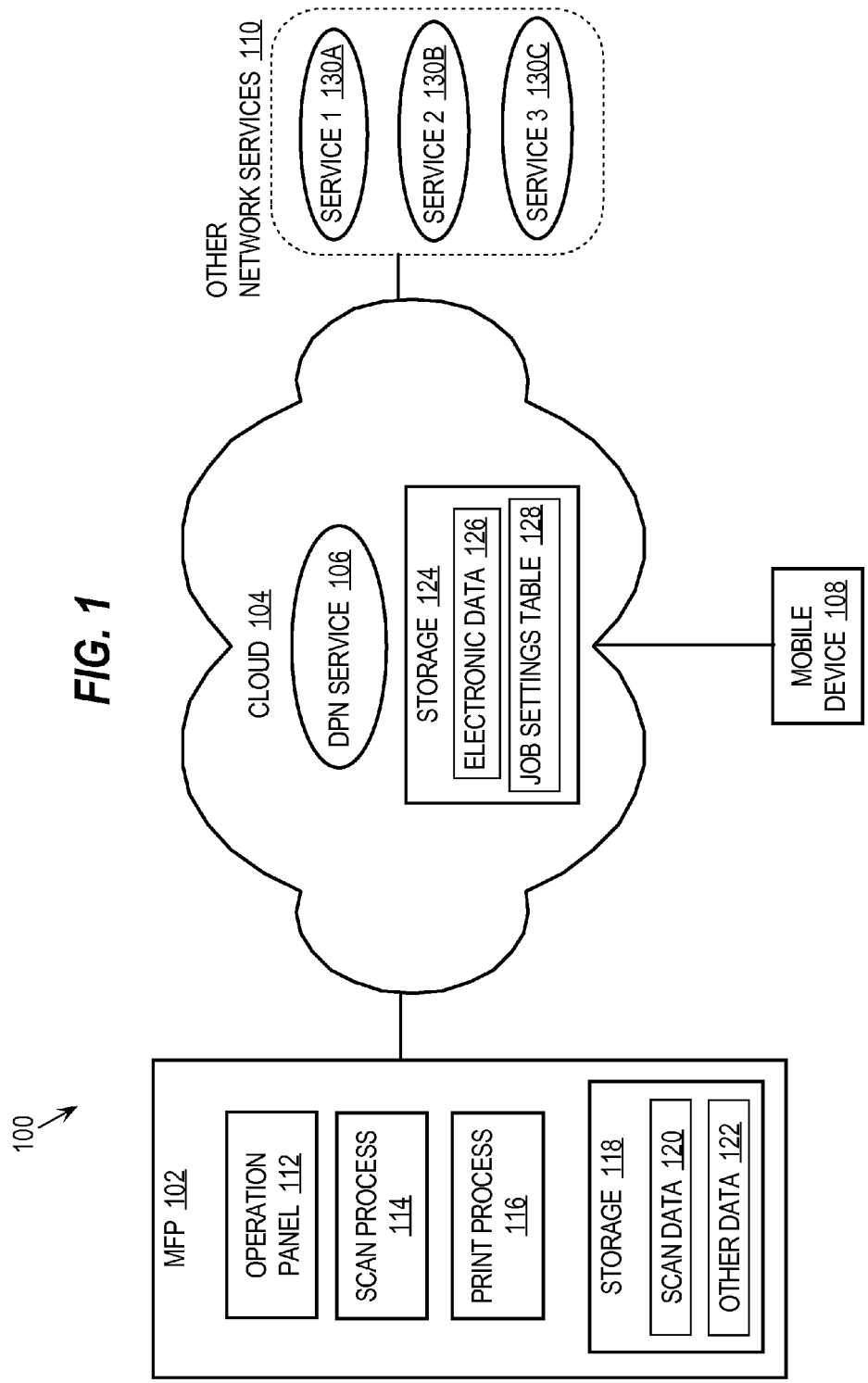
FIG. 1 is a block diagram that depicts an example architecture for processing document data, according to an embodiment of the invention.

An approach is provided for creating and completing a document processing job via a mobile device. A document processing network service executes on a network device receives II. Document Processing Job Architecture FIG. 1 is a block diagram that depicts an example architecture for processing document data. Architecture 100 includes an MFP 102, a cloud 104, a mobile device 108, and other network services 110 that are each communicatively coupled to cloud 104. For illustration purposes only, other network services 110 includes services 130A-C. However, embodiments of the invention are not limited to these three network services. There may be any number (including zero) of other network services 110 that are communicatively coupled to cloud 104. The links between cloud 104 and each of MFP 102, mobile device 108, and other network services 110 may be implemented by any medium or mechanism that provides for the exchange of data between the elements of FIG. 1. Examples of such links include, without limitation, a network such as a Local Area Network (LAN), Wide Area Network (WAN), Ethernet or the Internet, or one or more terrestrial, satellite or wireless links.

A. Cloud

A "cloud" is a computing system providing access via the Internet to processing power, storage, software or other computing services, often via a web browser. Thus, cloud 104 is viewed as a collection of services from the perspective of MFP 102 and mobile device 108. At the hardware level (although transparent to MFP 102 and mobile device 108), cloud 104 comprises one or more network devices that host the plurality of services.

Each of the services in a cloud is accessible via the Internet using an IP protocol. Thus, each service in a cloud may be associated with a different IP address and/or port number.

A cloud may be maintained by a single individual or organization (e.g., company). An example of a cloud is the VACS (Value-Added Cloud Solution) cloud provided by Ricoh Company, Ltd. However, multiple organizations may share responsibility in maintaining a particular cloud. A network service "outside" of a particular cloud (e.g., one of other network services 110) is provided by one or more individuals or organizations that are different than any individual or organization that maintains the particular cloud. Thus, other network services 110 are considered "third-party services" relative to the services in cloud 104.

In FIG. 1, cloud 104 includes a document processing network (DPN) service 106. DPN service 106 processes scanned document data as described in more detail hereinafter.

Cloud 104 may also include an OCR service (not shown) for converting scanned document data in non-text format, for example PDF, into text-based format. Cloud 104 may also include a forwarding service (not shown) for transmitting scanned document data in text format to one or more recipients. The OCR service and the forwarding service may be separate from DPN service 106 for purposes of explanation, but the OCR service and the forwarding service may be implemented as being part of DPN service 106.

Storage 124 stores electronic data 126, which may include scanned document data, text data (e.g., generated by an OCR service), and other types of data, such as image files and document files. Storage 124 may be implemented as any type of volatile or non-volatile storage for storing data used by DPN service 106. For example, storage 124 may be random access memory (RAM), one or more disks, or any combination of RAM and one or more disks for storing scanned document data.

Storage 124 also stores a job settings table 128 that includes associations between (a) job identifiers that identify a plurality of document processing jobs and (b) specific job settings for the plurality of document processing jobs. Job settings comprise one or more features and an option for each feature. Examples of job settings are provided below.

Although referred to as a table, job settings table 128 is not limited to a table implementation. The data stored in table 128 may instead be stored in a linked list, for example. An example of job settings table 128 is Table 1.

TABLE 1

| JOB IDENTIFIER | JOB SETTINGS | USER DATA | WORKFLOW DATA | DEVICE IDENTIFIER |
|---|---|---|---|---|
| 12CFX | ... | | ... | MFP100 |
| 65GJK | ... | User200 passw2 | | 121.3.28.253 |
| TTTFFF | ... | UserHG | ... | |

Table 1 comprises three rows (one row for each document processing job) and five columns: (1) a job identifier column that identifies, for each document processing job, an identifier for the document processing job; (2) a job settings column that stores, for each document processing job, specific job settings for the document processing job; (3) a user data column that (optionally) identifies, for each document processing job, a user that created the document processing job; (4) workflow data column that (optionally) indicates, for each document processing job, a workflow for the document processing job; and (5) a device identifier column that (optionally) identifies, for each document processing job, a device (or class of devices) that is allowed to process the document processing job.

The job settings stored in the job settings column may be stored in any format, such as plain text or XML. The job settings in the job settings column may be stored in the same format as the job settings that are received (if any) from mobile device 108. As another example, the job settings in the job settings column may be stored in the format (e.g., a PDL, or page description language, format) that is required for the document processing device (e.g., MFP 102) that is to receive the document processing job.

Some of the columns in Table 1 may be optional, such as the user data column, the workflow data column, and the device identifier column. Any user data stored in the user data column may include the authentication information sent from mobile device 108 or may include any data that identifies the user to cloud 104. Workflow data is described in more detail below. Any data stored in the device identifier column may include an IP address and/or name of a document processing device.

B. Mobile Device

Mobile device 108 is a device that communicates with cloud 104 by providing, to cloud 104, job settings data for a particular document processing job, such as a print job or a scan job. Mobile device 108 may be implemented as any type of device with wireless functionality and a graphical user interface. Non-limiting examples of mobile device 108 include, without limitation, cellular telephony devices such as cell phones, personal digital assistants (PDAs), and a tablet device.

Mobile device 108 displays, e.g., on a touch screen display, a series of graphical displays, each of which allows a user to make selections to initiate a document processing job.

In an embodiment, an application executes on mobile device 108 and prompts a user of mobile device 108, via a user interface, to enter authentication information, such as a username and password. Once entered, the user is not required to re-enter the authentication information. The authentication information may be stored, for example, persistently on mobile device 108. Thus, when the user seeks access to one or more services in cloud 104, the job settings application retrieves the authentication information and sends the authentication information to cloud 104.

In an embodiment, the application is a web-based browser that communicates with a service (e.g., DPN service 106) in cloud 104 via HTTP. Thus, the application retrieves one or more job setting interfaces (i.e., that allow a user to specify one or more job settings for a document processing job) from the service.

Alternatively, the application is not a web-based browser. Thus, such an application does not need to communicate with a server in cloud 104 in order to display the one or more job setting interfaces. However, in such an embodiment, any updates to the application must be distributed to each mobile device that executes the application. In contrast, with a browser-based implementation, no such updates need to be made. Instead, any updates to job settings interfaces are made to the server that receives requests from the browser-based application and that delivers the job settings interfaces to the browser-based application.

When starting up, the application (whether browser-based or not) causes one or more selectable icons to be displayed, each of which is associated with a different service provided by an MFP, such as MFP 102. For example, one selectable icon may correspond to printing, another selectable icon may correspond to scanning, and another selectable icon may correspond to faxing.

In an embodiment, the information that is displayed on a screen of mobile device 108 is personalized to the user of mobile device 108. The personalization of the displayed information may be based on previous interactions (such as previous document processing jobs) between mobile device 108 and cloud 104. For example, if the user has used a set of scan job settings one or more previous scan jobs, then the application displays on option to select that set of scan job settings without having to individually select each setting in the set. The job settings of previous document processing jobs may be stored on mobile device 108 and accessible to the application executing on mobile device 108. Alternatively, the job settings may be stored in cloud 104 (e.g., in storage 124) in association with user data that identifies the user of mobile device 108. Thus, after the application starts up on mobile device 108, the application requests, from DPN service 106, one or more sets of job settings for one or more previous document processing jobs and displays selectable data that corresponds to each set of job settings.

C. MFP

MFP 102 is a device that includes the capability to process document data. Although the description herein refers to MFP 102, MFP 102 may instead only provide a single function, such as scanning, printing, copying, or faxing.

MFP 102 may have the capability to scan one or more printed documents and generate scanned document data that represents the one or more printed documents. The scanned document data may be in a variety of formats, depending upon a particular implementation. One example format is the portable document format (PDF) by Adobe Systems, Inc. MFP 102 may also include a capability to convert scanned document data from a non-text format, such as PDF, to a text-based format, using for example, optical character recognition (OCR).

If MFP 102 includes the capability to scan one or more printed documents to generate scanned document data, then MFP 102 may also include the capability to transmit the scanned document data to another location or device, for example, to a computer connected to the MFP 102 or over a network to a network device.

In FIG. 1, MFP 102 includes an operation panel 112, a scan process 114, a print process 116 and storage 118. The operation panel 112 is configured to display information to a user and to accept user input. The particular implementation of the operation panel 112 may vary depending upon a particular implementation. For example, the operation panel 112 may include a screen on which a graphical user interface (GUI) is displayed. In addition, the screen may be a touch screen that allows a user to select icons and GUI objects on the GUI. The GUI may be updated to reflect changes in the functionality offered by the MFP 102. The operation panel 112 may also include control buttons and a numeric keypad for receiving user input. Operation panel 112 is described in more detail below with reference to FIG. 2.

Scan process 114 is configured to cause one or more printed documents to be scanned by MFP 102 and generate scanned document data that represents the one or more printed documents. Scan process 114 may be initiated, for example, in response to a user selection of the start user control 208.

Print process 116 is configured to cause one or more documents to be printed by MFP 102 based on electronic document data. Print process 116 may be initiated, for example, in response to a user selection of the start user control 208.

Storage 118 may be any combination of volatile or non-volatile storage for storing data used by MFP 102. For example, the storage 118 may be random access memory (RAM), one or more disks, or any combination of RAM and one or more disks for storing scanned document data. As depicted in FIG. 1, storage 118 may store scan data 120 and other data 122. Other data 122 may include other scan data or other types of data, such as word processing document files. MFP 102 may include other modules and processes that are not depicted in FIG. 1 for purposes of brevity.

D. Operation Panel

Figure 2:
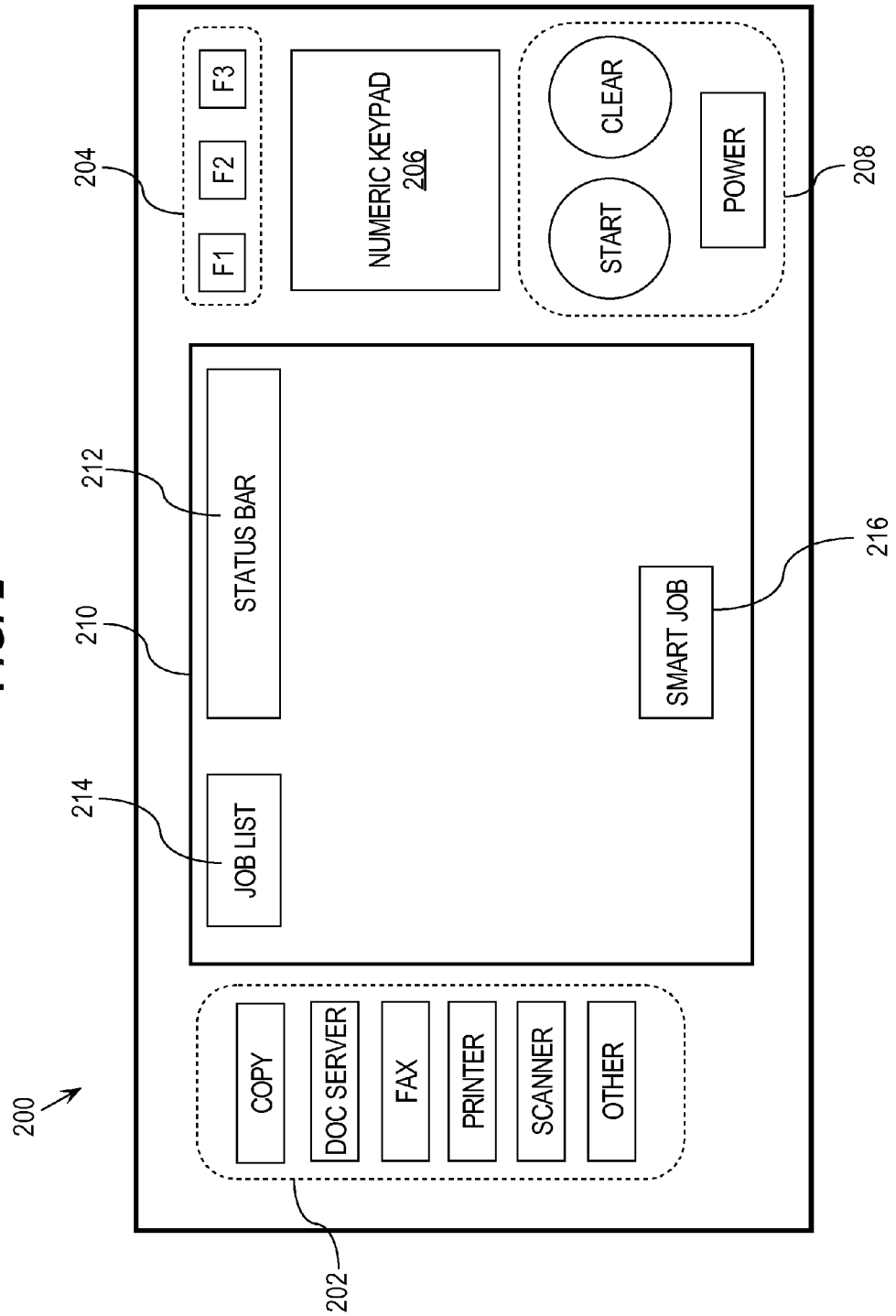
FIG. 2 depicts an example operation panel of an MFP, according to an embodiment of the invention.

FIG. 2 depicts an example operation panel 200 of the MFP 102. Operation panel 200 includes a set of user interface controls 202 for activating functions of the MFP 102. The user interface controls on operation panel 200 may be graphical, non-graphical, or a combination of graphical and non-graphical. The functions depicted in FIG. 2 includes copy, connect to a document server, fax, print, copy and other functions. These functions are provided as examples of typical functions that may be implemented on an MFP, but the functions implemented on any particular MFP may vary depending upon the implementation. Operation panel 200 also includes a set of function buttons 204 that may be assigned to various functions provided on MFP 102. Operation panel 200 also includes a numeric keypad 206 and a set of user controls 208 for toggling the power, starting a function, and clearing the current function. These are examples of the user controls that are typically included on a scanning device. More or fewer user controls may be provided, depending upon a particular implementation.

Operation panel 200 also includes a GUI 210 for displaying information and receiving user input. GUI 210 may be a touch screen that is capable of detecting user selection of icons and GUI objects displayed on GUI 210. GUI 210 may be stored on MFP 102 and loaded directly from local storage of MFP 102 (e.g., storage 118).

Alternatively, GUI 210 is provided by DPN service 106 or another service in cloud 104. A browser (not shown) executing on MFP 102 may request GUI 210 from a service in cloud 104. The browser may send a HTTP request in response to selection of the scanning function on the set of UI controls 202 or upon startup of MFP 102. In this way, GUI 210 may be updated remotely at any time before GUI 210 is loaded onto MFP 102. Also, by relying on a service of cloud 104 for GUI 210, MFP 102 is removed from the responsibility for persistently storing, updating, or otherwise maintaining GUI 210.

In the present example, GUI 210 includes a status bar GUI object 212 that displays status information, such as the status of the MFP 102 or the status of one or more document processing jobs, such as scan jobs and print jobs. GUI 210 also includes a job list GUI object 214 which, when selected, displays a list of jobs associated with the MFP 102, for example, document processing jobs that have been processed and/or document processing jobs that are currently being processed.

In an embodiment, GUI 210 includes a "smart job" GUI object 216. Additionally or alternatively, operation panel 200 includes a non-graphical (i.e., physical) button that causes the same operation(s) to be performed when selected as when smart job GUI object 216 is selected.

User selection of smart job GUI object 216 causes MFP 102 to display a job identifier entry field in which a job identifier may be entered. In an embodiment, the entry field is a text entry field into which a user may type one or more characters (alphanumeric and/or non-alphanumeric). The one or more characters may be entered via GUI 210 or via numeric keypad 206 on MFP 102. The one or more entered characters comprises a job identifier (or job code, described later herein in more detail), which MFP 102 transmits to cloud 104 (or DPN service 106). DPN service 106 uses the job identifier to identify one or more job settings associated with the job identifier. DPN service 106 then transmits the one or more job settings to the MFP 102. If the document processing job associated with the job identifier is a print job, then one or more electronic documents have also been associated with the job identifier. Thus, DPN service 106 also identifies and transmits those one or more electronic documents to MFP 102.

GUI 210 may include any number of other GUI objects depending upon a particular implementation, and the GUI objects depicted in FIG. 2 are provided as non-limiting examples.

III. Creating a Document Processing Job

Figure 3:
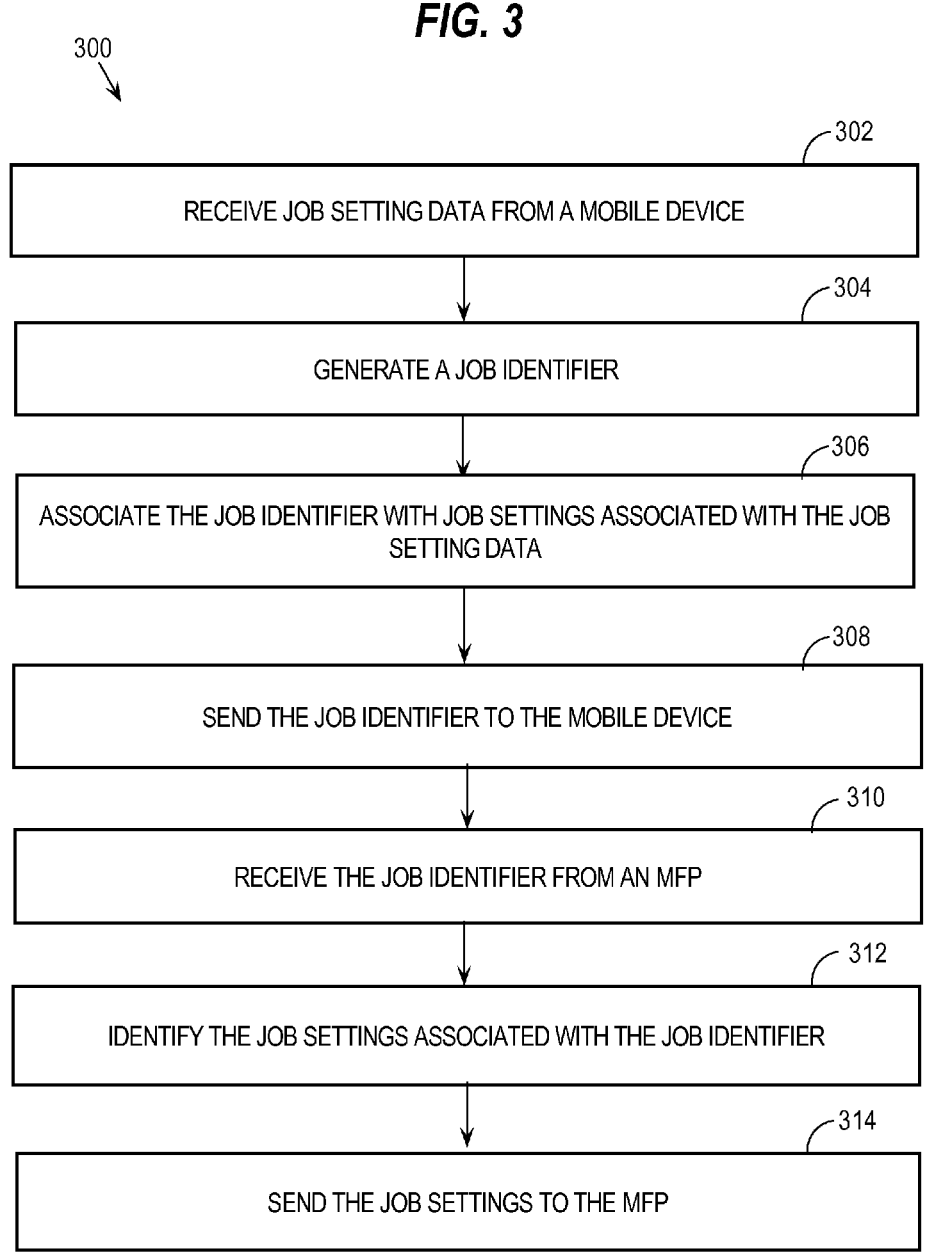
FIG. 3 is a flow diagram that depicts an approach for creating a document processing job using a mobile device, according to one embodiment of the invention.

FIG. 3 is a flow diagram 300 that depicts an approach for creating a document processing job using a mobile device, according to one embodiment of the invention. The steps depicted in flow diagram 300 are performed by DPN service 106 and/or by one or more other services in cloud 104.

In step 302, DPN service 106 receives job settings data from mobile device 108. The job settings data may be sent from mobile device 108 in any particular format, such as XML or simple text. Step 302 may be preceded by multiple steps performed by mobile device 108 and a user of mobile device 108. For example, step 302 may comprise a user of mobile device 108 selecting an icon associated with a job settings application. The selection causes the job settings application to begin executing on mobile device 108. The job settings application is configured to communicate with DPN service 106 (and, optionally, with one or more services associated with DPN service 106). The job settings application causes a service selection interface to be displayed. The service selection interface may be stored locally on mobile device 108 or may be retrieved, over a network, from DPN service 106. The service selection interface may include multiple "service" icons corresponding to multiple services that the user may desire. Non-limiting examples of services include a print service, a scan service, a fax service, and a copy service.

To authenticate itself to DPN service 106, the job settings application sends authentication data to DPN service 106. The user may have entered the required authentication information during a previous session with the job settings application. The job settings application may send the authentication data in response to starting up or some time later, such as when the user selects one of the service icons.

Selection of a service icon causes the job settings application to display a second interface that corresponds to the service associated with the selected service icon. For example, selection of a print service icon causes a document selection interface to be displayed. The document selection interface allows a user to select one or more electronic documents for printing. The document selection interface may display, for example, a list of storage locations in which one or more electronic documents are stored. Non-limiting examples of electronic documents include Word documents, an Excel documents, a PowerPoint documents, digital images, and PDFs. The one or more electronic documents may be stored and maintained by cloud 104 and/or by one or more of other network services 110. Non-limiting examples of other network services 110 include Box.net™, Google Docs™, Salesforce.com™, Evernote™, and Jigsaw™.

Continuing with the print example, selection of a storage location from the list of storage locations may cause a list of electronic documents that are stored at the storage location to be displayed. Selection of one of the electronic documents in the list causes (at least eventually) document identification data (i.e., that identifies the selected electronic document) to be sent to DPN service 106. This document identification data and later-generated job settings data is stored and later used to complete a print job at MFP 102 (or another device with printing capability, not shown).

Continuing with the print example, the job settings application executing on mobile device 108 causes a print job setting interface to be displayed. The print job setting interface may be displayed prior to the document selection interface being displayed or after the document identification data is generated. The print job setting interface allows the user to select one or more print job settings that indicates a plurality of print features and options. Non-limiting examples of print features include page size, color/grey scale, duplex/simplex, orientation, scaling, and page order. Options for page size may be, for example, A4 and 8.5×11; options for orientation may be portrait, landscape, and rotated landscape; and options for page order may be front to back and back to front. The user, via the print job setting interface, selects a print option for each of one or more of the print features. Some of the print features may already be associated with default print options. The set of print options (whether user-selected or default) comprise the one or more print job settings and is considered print job settings data.

As an example of a user selecting another service icon (i.e., other than a print service icon), selection of a scan service icon causes a scan job settings interface to be displayed. The scan job settings interface allows the user to input scan job settings data that indicates a plurality of scan features and options. Non-limiting examples of scan features include a file format of the resulting scanned document data and resolution of resulting scanned document data. The user, via the scan job settings interface, selects a scan option for one or more of the scan features. Some of the scan features may already be associated with default scan options. The set of scan options (whether user-selected or default) comprise scan job settings data.

Once all the necessary job settings data (e.g., print job settings data or scan job settings data) has been established, further input may be required from the user to cause the application to submit the job settings data to DPN service 106.

In a related embodiment, instead of comprising one or more specific job settings, job settings data that the application causes mobile device 108 to send to DPN service 106 comprises a job settings identifier that is associated with one or more specific job settings. Thus, DPN service 106 stores associations between job settings identifiers and sets of one or more specific job settings.

In step 304, DPN service 106 determines a job identifier. The job identifier may be generated in response to receiving the job settings data. Alternatively, the job identifier is a pre-computed value that DPN service 106 retrieves from storage in response to receiving the job settings data. The job identifier may comprise alphanumeric characters, non-alphanumeric characters, or any combination thereof. The job identifier uniquely identifies one or more specific job settings and, in the case of a print job, document identification data. The one or more job settings (or job settings identifier) may be used to generate the job identifier. Alternatively, DPN service 106 may use a random number generator to generate the job identifier. Embodiments of the invention are not limited to any particular technique for determining a job identifier.

In step 306, DPN service 106 (a) associates the job identifier with the one or more job settings that are associated with the job settings data received from mobile device 108 and (b) stores this association in, for example, storage 124. An example of this association is a row in Table 1, described above.

In step 308, DPN service 106 sends the job identifier to mobile device 108, which displays the job identifier to the user. The user later manually inputs this job identifier into a document processing device, such as MFP 102.

In step 310, DPN service 106 receives the job identifier from MFP 102. This step may be performed in response to one or more user actions. For example, prior to step 310, the user of mobile device 108 (or another user) selects smart job GUI object 216 and inputs a job identifier into an input field displayed on MFP 102. This job identifier may be the same job identifier generated in step 304. In response to receiving the job identifier, MFP 102 sends the job identifier to DPN service 106. For example, MFP 102 sends an HTTP request via an IP protocol to DPN service 106, where the HTTP request includes the job identifier.

In step 312, in response to receiving the job identifier, DPN service 106 identifies one or more job settings based on the association (created in step 306) between the job identifier and the one or more job settings. This identifying step may be performed by scanning the job identifier column of Table 1 until a row is found that has the same identifier as the job identifier received in step 310.

In step 314, DPN service 106 sends the one or more job settings to MFP 102. The one or more job settings may be included in an HTTP response message generated by DPN service 106 and sent to MFP 102. The one or more job settings sent to MFP 102 may be in any particular format that is the same as or different than the format of the job settings data that is received from mobile device 108 in step 302. For example, the one or more job settings may be in a PDL (page description language) format. Specific examples of PDLs include PCL (Printer Command Language from HP), PDF (from Adobe), PostScript (from Adobe), and AFP (Advanced Function Presentation from IBM).

In an embodiment, in the print job context, DPN service 106 uses a printer driver to render an electronic document into data that the target printer (e.g., MFP 102) can process, such as a PDL. If DPN service 106 communicates with multiple types of printers that require different printer drivers, then DPN service 106 has access to multiple printer drivers. Additionally or alternatively, a printer may accept electronic document data that is not in a PDL format, or a format that the printer can process according to the specified job settings. In such a scenario, the printer first converts a, for example, Word document into a PDL format that the printer can process.

The approach described herein for creating and processing a document processing job provides a beneficial workflow for users. The approach allows a user to enter authentication information into his/her mobile device once (and is stored persistently for subsequent document processing sessions) without having to enter the authentication information each time the user operates a document processing device, such as an MFP. The approach also allows a user to interact with a user-friendly and visually appealing interface displayed by the user's mobile device. For example, user interfaces on mobile devices are in color while MFP user interfaces tend to be in black and white. Further, the approach allows a user to create a document processing job virtually anywhere (with an Internet connection) and then to delay when that document processing job is processed. For example, the user may want to physically see which MFP(s) are available before completing the job.

In an embodiment, DPN service 106 stores device identification data in association with a job identifier. The device identification data identifies or indicates one or more document processing devices or one or more classes of document processing devices. The device identification data may be received from mobile device 108 as part of the document processing job that is generated. Thus, the device identification data may be received with, immediately before, or immediately after to the reception of the job settings data received in step 302. Alternatively, the device identification data may have been stored (previous to step 302) in association with user authentication data. One benefit of device identification data is that a user can limit which document processing device is allowed to process a document processing job. In other words, device identification data may be used as an extra layer of security. For example, if another user enters a job identifier at an MFP that is not indicated in the device identification data that is associated with the job identifier, then DPN service 106 will not send the associated one or more job settings to that MFP in response to receiving the job identifier from that MFP.

Alternatively, absence of device identification data for a particular document processing job may imply that any document processing device may be used to process that particular document processing job. This scenario provides flexibility to a user. For example, if a user wants to complete a scan job at an MFP, but, when the user arrives at the MFP, the MFP is being serviced or is otherwise not able to process the scan job, then the user may go to another MFP to process the scan job. As another example, if a user wants to complete a print job at an MFP but the user discovers that the MFP does not have sufficient paper or does not support one of the features and/or options (e.g., color) indicated the job settings, then the user may go to another MFP that supports all the features and options reflected in the job settings.

Figure 4:
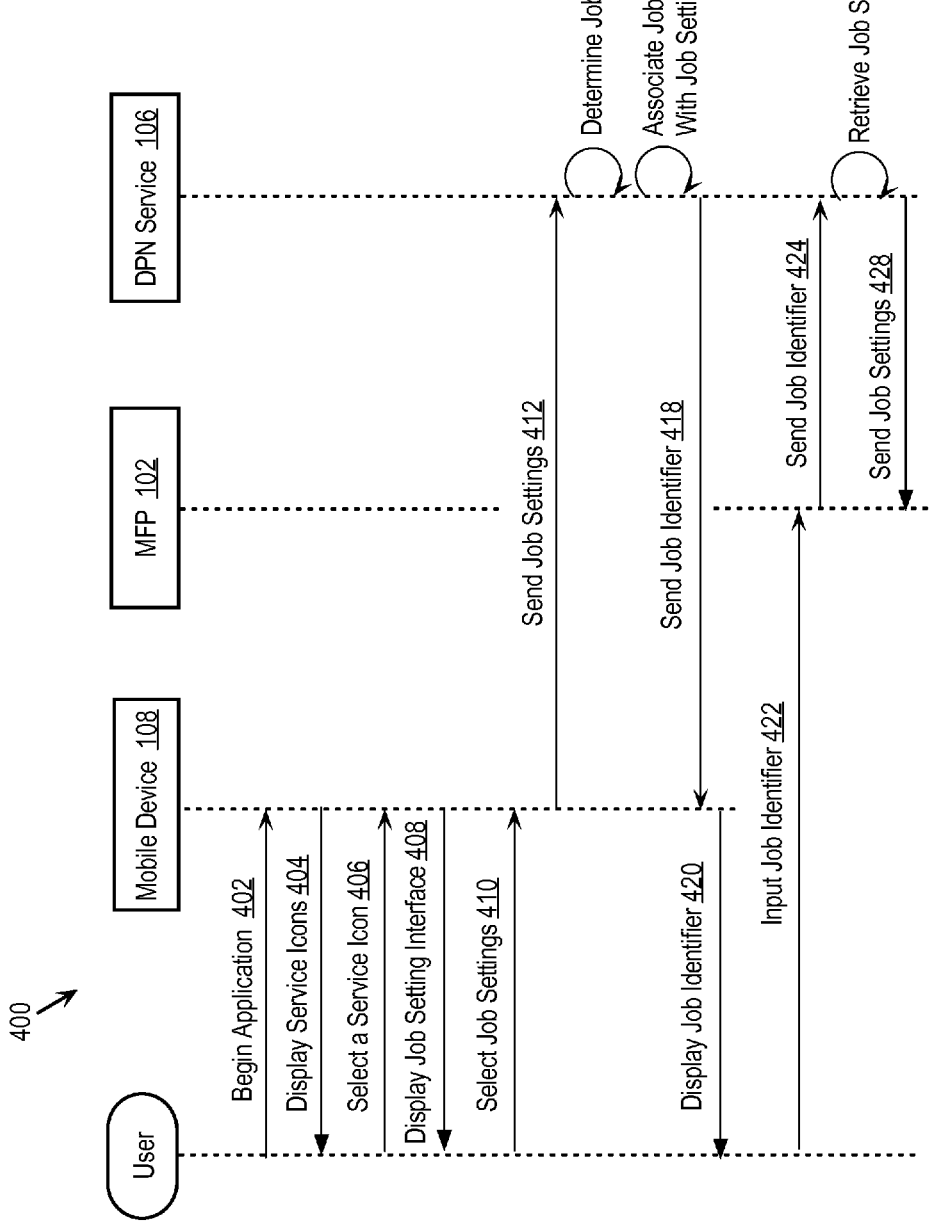
FIG. 4 is a message ladder diagram that depicts an example message exchange between the elements of FIG. 1 during the creating and processing of a document processing job, according to an embodiment of the invention.

FIG. 4 is a message ladder diagram 400 that depicts an example message exchange between the elements of FIG. 1 during the creating and processing of a document processing job. In step 402, a user initiates the execution, on mobile device 108, of a job setting application.

In step 404, in response to the user's initiation of the job setting application, the job setting application causes one or more service icons to be displayed on a screen of mobile device 108. The one or more service icons may include, for example, a print service icon, a scan service icon, a fax service icon, and a copy service icon.

In step 406, the user selects one of the displayed service icons.

In step 408, in response to user selection of one of the displayed service icons, the application causes a job settings interface to be displayed on a screen of mobile device 108. The job settings interface that is displayed corresponds to the service associated with the selected service icon. For example, if a print service icon is selected, then the job settings application causes a print job settings interface to be displayed (at least eventually). If a scan service icon is selected, then the job settings application causes a scan job settings interface to be displayed.

In step 410, the user selects one or more job settings via the job settings interface. Some of the job settings may be default settings. Alternatively, the user may select a pre-defined job settings option that is associated with multiple job settings. In this manner, the user does not have to select one or more specific job settings. This may be useful where the user has used the same set of job settings for one or more previous document processing jobs.

In step 412, the job settings application sends job settings data to DPN service 106. The job settings data may include the selected (and/or default) job settings or may include a job settings identifier that is associated with one or more specific job settings. This association may be stored in, for example, storage 124 of cloud 104.

In step 414, in response to receiving the job settings data, DPN service 106 determines a job identifier. As disclosed herein, the job identifier may be generated in response to receiving the job settings data or may have been generated previously. In fact, the job identifier may have been generated by a different entity (e.g., another service in cloud 104) and provided to DPN service 106.

In step 416, DPN service 106 associates the job identifier with the one or more job settings associated with the job settings data received in step 412.

In step 418, DPN service 106 sends the job identifier to mobile device 108.

In step 420, the job settings application causes the job identifier to be displayed on a screen of mobile device 108 to enable the user to enter the job identifier later on a document processing device, such as MFP 102.

In step 422, the user (or another user) inputs the job identifier into MFP 102.

In step 424, in response to receiving the input, MFP 102 sends the job identifier to DPN service 106.

In step 426, in response to receiving the job identifier from MFP 102, DPN service 106 looks up the one or more job settings that are associated with the job identifier.

In step 418, DPN service 106 sends the one or more job settings to the MFP 102.

Although not shown, the user is then able to complete the document processing job (e.g., a print job or scan job) without being required to (a) enter authentication information at MFP 102 or (b) select any specific job settings at MFP 102. Instead, at the MFP, the user is only required to enter the job identifier (sent from DPN service 106) and, optionally, for example, a "Go" or "Enter" button to begin the processing of the document processing job that is created via mobile device 108.

In an embodiment, the user is allowed to modify, at the MFP, the job settings of a document processing job before initiating, at the MFP, the processing of the document processing job. For example, the user may select a paper size that is different than the paper size indicated in the job settings that are sent from DPN service 106 and displayed by MFP 102 on GUI 210.

IV. Restrictions on Document Processing Devices

In an embodiment, a user is limited as to which document processing devices the user can use to complete a document processing job that the user created via the user's mobile phone. For example, a user (and his/her authentication information) may be associated with one or more organizations or levels of access. Each organization and/or level of access is associated with one or more specific document processing devices. In this way, a user is limited to using only the document processing device(s) that are associated with the organization or level of access with which the user is associated. Alternatively, the user may be directly associated with one or more specific document processing devices.

For example, a user uses a mobile device (e.g., mobile device 108) to create a document processing job, receives a valid job identifier, and enters the job identifier into an MFP (e.g., MFP 102). The MFP sends the job identifier and identification data to a cloud service (e.g., DPN service 106). The identification data may identify the specific MFP or an organization (e.g., ORG12) with which the MFP is associated. The identification data may be embodied in a URL that the MFP uses to send the job identifier to the cloud service. The cloud service determines the organization with which the user is associated. This determination may be based on user data (e.g., authentication data) that is associated with the job identifier. If the user's organization is not the same as the organization associated with the MFP, then the job settings associated with the job identifier are not sent to the MFP. Thus, the user is unable to use one or more services provided by the cloud. Also, the user is unable to use the MFP, at least for that document processing job.

In an alternative embodiment, a user that is registered with cloud 104 (or with DPN service 106) is able to use any document processing device (or MFP) that is also registered with cloud 104 (or DPN service 106). In this way, regardless of where the user is located, as long as the user is registered with cloud 104 and has access to a document processing device that is registered with cloud 104, the user is able to use that document processing device to complete a document processing job that was created via the user's mobile device.

V. Workflows

In an embodiment, the application that executes on mobile device 108 causes a workflow history interface to be displayed on a screen of mobile device 108. The workflow history interface may list one or more previous workflows used by the user and/or one or more default workflows. A workflow is a pre-defined set of one or more operations and any attributes associated with each operation in the set. A workflow may be of varying complexity. If a workflow comprises a plurality of operations, then the workflow may indicate an ordering of each operation relative to the one or more other operations in the plurality.

For example, a particular (whether previous or default) workflow may comprise a scan operation where the attributes (or scan job settings) are color (as opposed to grey scale) and 600 dpi as the resolution. The particular workflow may also comprise an OCR operation that succeeds the scan operation, where an attribute associated with the OCR operation is a specific text format (e.g., DOC format) for the text that results from the OCR operation. In order for the OCR operation to be performed, the results of the scan operation are sent, from the scanning device (e.g., MFP 102), to an OCR service in cloud 104, where the OCR service performs the OCR operation. The particular workflow may also comprise a forward operation, where the attribute(s) associated with the forward operation are one or more destinations (e.g., an email address, a third party storage network service) to which the text (i.e., resulting from the OCR operation) will be sent. The forward operation may be performed by the OCR service or another network service in cloud 104. The particular workflow may also comprise a confirmation operation, where an attribute associated with the confirmation operation is a destination (e.g., email address, phone number for texting) to which a confirmation will be sent. The confirmation may indicate that one or more of the operations in the particular workflow completed successfully.

In the embodiment where a workflow history interface is displayed, the user simply selects one of the displayed workflows without having to re-enter any of the specific job settings associated with the selected workflow.

In the embodiment where a workflow history interface is displayed and a specific workflow is selected by the user, a workflow identifier that identifies the workflow is sent to DPN service 106. In this embodiment, DPN service 106 stores associations between workflow identifiers and job settings data. Alternatively, selection of a particular workflow causes the job settings application to send, to DPN service 106, the job settings (including operations) associated with the particular workflow.

In an embodiment, once a user has selected a set of operations and attributes for a specific document processing job that the user is creating (and with which a job identifier is associated), the application automatically saves the selected set of operations and attributes as a particular workflow, for example, in a "workflow favorites" list. In other words, the application associates the selected set of operations and attributes with a workflow identifier. Later (e.g., after the user starts up the application for another session), the application causes a workflow icon to be displayed to the user, where the workflow icon corresponds to the particular workflow.

In an embodiment, the application executing on mobile device 108 causes a workflow generation interface to be displayed on a screen of mobile device 108. The workflow generation interface allows a user to create and save a workflow for later use. Thus, the workflow generation interface allows a user to select one or more operations (to be performed by a cloud service and/or by a document processing device) and any attributes associated with each operation. Thus, a workflow may be generated without the user having to create an actual document processing job.

In an embodiment, workflow data is stored on a document processing device, such as MFP 102. In this way, a cloud service (e.g., DPN service 106) is only required to send a workflow identifier to the document processing device, which stores multiple association, each association associating a workflow identifier with a particular set of workflow data (that identifies a plurality of operations and attributes associated with the plurality of operations).

VI. Leveraging Information on a Mobile Device

In an embodiment, information stored on or in association with a mobile device is leveraged (or used) to allow performance of one or more additional functions. For example, in addition to job settings data, mobile device 108 may also send, to DPN service 106, contact data that is stored on mobile device 108. In addition to job settings, the contact data may also be associated with the job identifier determined for the document processing job. The contact data indicates contact information of one or more contacts. Non-limiting examples of contact information include telephone numbers, email addresses, fax numbers, and storage locations. This contact data may be used by DPN service 106 or MFP 102 in conjunction with the receiving of a document processing job. For example, the contact data may be used to send a confirmation that a particular document processing job (with which the contact data is associated via a job identifier) has completed. Thus, in one embodiment, the contact data is sent to MFP 102 and the MFP 102 uses the contact data to perform one or more functions (e.g., scan-to destination, confirmation). In another embodiment, the contact data is not sent to MFP 102 and, instead, DPN service 106 uses the contact data to perform one or more functions.

As an example, in a scan job scenario, the scan job settings data sent to DPN service 106 may indicate an email address for which an email message will be generated and to which the email message will be sent upon completion of the associated scan job by MFP 102. The email address is sent, along with the scan job settings data, to MFP 102. MFP 102 generates the email message, attaches the scanned document data, generated by MFP 102, to the email message, and, optionally, includes information about where and when the scan job was processed.

As another example, in a print job scenario, DPN service 106 receives print job settings data (for a print job) and contact data from mobile device 108. In response to the successful generation of one or more printed documents reflected in electronic document data associated with the print job, MFP 102 sends, to DPN service 106, completion data that indicates that the print job was completed successfully. In turn, DPN service 106 identifies the contact data (which is stored in association with the print job via, e.g., the job identifier) and sends, for example, a text message or an email message to one or more intended recipients indicated in the contact data. Additionally or alternatively, DPN service 106 stores confirmation data in storage (e.g., storage 124) for every document processing job that completes, i.e., regardless of the presence or absence of contact data.

VII. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
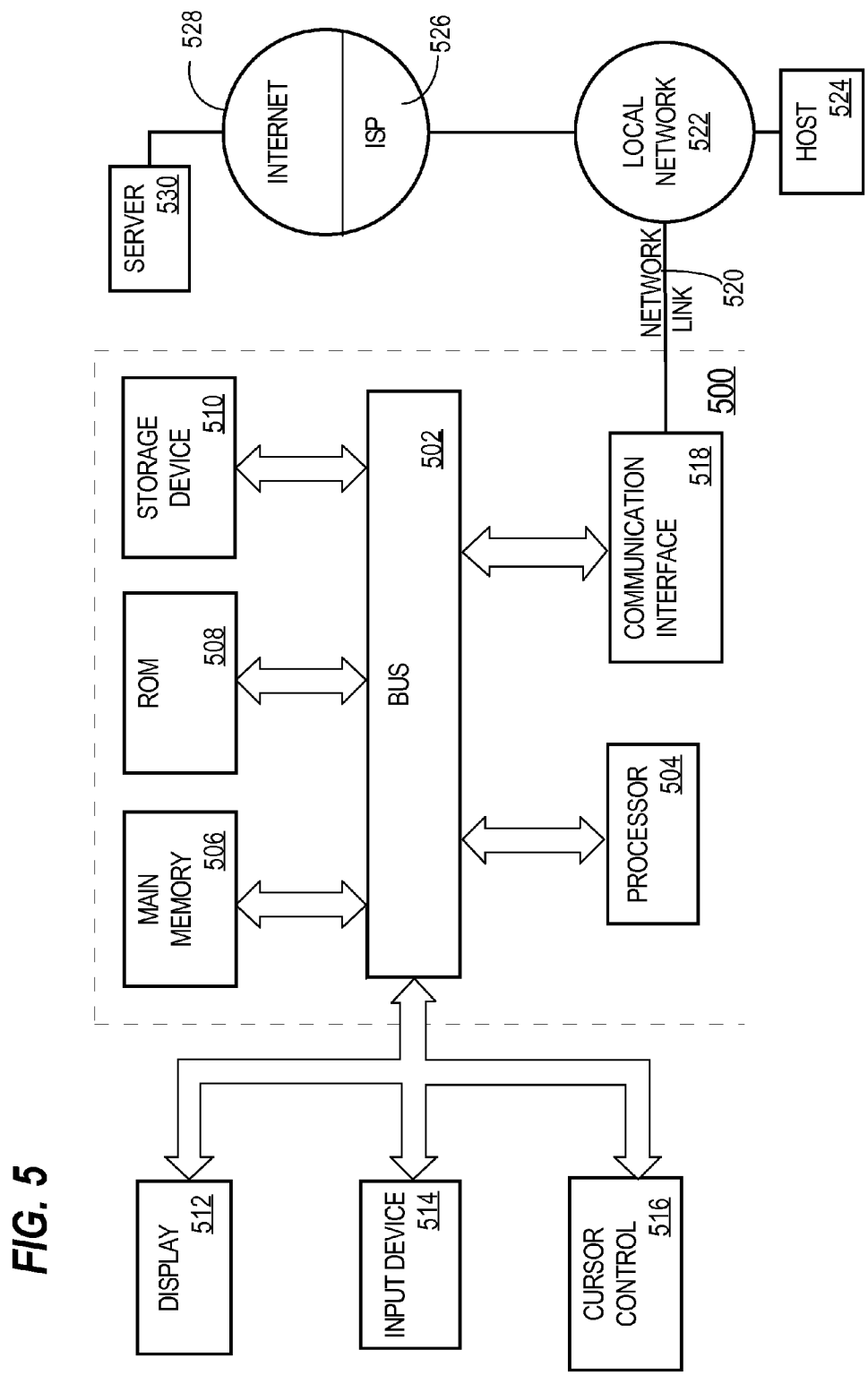
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more storage media storing instructions which, when executed by one or more processors, cause performance of the steps of:
    receiving, from a mobile device, job settings data that is associated with one or more job settings for a document processing job;
    in response to receiving the job settings data:
        determining a job identifier and associating the job identifier with the one or more job settings;
        sending the job identifier to the mobile device;
    after sending the job identifier to the mobile device:
        receiving the job identifier from a document processing device that is different than the mobile device;
        identifying the one or more job settings based on the job identifier; and
        sending the one or more job settings to the document processing device;
    wherein the document processing device processes one or more documents based on the job settings data;
    wherein the steps are performed by one or more computing devices that are different than the mobile device and the document processing device.

2. The one or more storage media of claim 1, wherein the document processing job is one of a print job, a scan job, a copy job, or a fax job.

3. The one or more storage media of claim 1, wherein the mobile device is one of a smart phone or a tablet device and has wireless connectivity with a document processing network service that performs the steps of determining and identifying.

4. The one or more storage media of claim 1, wherein:
receiving job settings data comprises receiving, from the mobile device, document identification data that identifies one or more electronic documents to process;
associating the job identifier with the one or more job settings comprises associating the job identifier with the document identification data; and
sending the job settings data to the document processing device comprises sending the one or more electronic documents to the document processing device.

5. The one or more storage media of claim 1, wherein:
receiving job settings data comprise receiving, from the mobile device, destination data that indicates a destination that is different than the document processing device;
associating the job identifier with the one or more job settings comprises associating the job identifier with the destination data;
the instructions, when executed by the one or more processors, further cause, after sending the job settings data to the document processing device:
receiving scanned document data from the document processing device;
identifying the destination data; and
based on the destination data, sending the scanned document data to the destination.

6. The one or more storage media of claim 1, wherein the job settings data includes:
the one or more job settings; or
a job settings identifier that is associated with the one or more job settings and a document processing network service that receives the job settings data uses the job settings identifier to retrieve the one or more job settings.

7. The one or more storage media of claim 1, wherein receiving job settings data comprises receiving workflow data that is associated with a plurality of operations to be performed with respect to document data and a plurality of attributes that correspond to the plurality of operations.

8. The one or more storage media of claim 7, wherein the workflow data includes:
the plurality of operations and the plurality of attributes; or
a workflow identifier and a document processing network service that receives the workflow data uses the workflow identifier to identify the plurality of operations and the plurality of attributes.

9. The one or more storage media of claim 1, wherein:
receiving job settings data from the mobile device comprises receiving contact data from the mobile device; and
the instructions, when executed by the one or more processors, further cause performing at least one of:
(a) sending the contact data to the document processing device, or
(b) receiving, from the document processing device, completion data that indicates that the document processing job is completed,
in response to receiving the completion data, identifying one or more contacts indicated in the contact data, and
causing a message to be sent to each contact of the one or more contacts.

10. A system comprising:
one or more processors;
one or more storage media storing instructions which, when executed by the one or more processors, cause performance of the steps of:
receiving, from a mobile device, job settings data that is associated with one or more job settings for a document processing job;
in response to receiving the job settings data:
determining a job identifier and associating the job identifier with the one or more job settings;
sending the job identifier to the mobile device;
after sending the job identifier to the mobile device:
receiving the job identifier from a document processing device that is different than the mobile device;
identifying the one or more job settings based on the job identifier; and
sending the one or more job settings to the document processing device;
wherein the document processing device processes one or more documents based on the job settings data;
wherein the system is different than the mobile device and the document processing device.

11. The system of claim 10, wherein the document processing job is one of a print job, a scan job, a copy job, or a fax job.

12. The system of claim 10, wherein the mobile device is one of a smart phone or a tablet device and has wireless connectivity with a document processing network service that performs the steps of determining and identifying.

13. The system of claim 10, wherein:
receiving job settings data comprises receiving, from the mobile device, document identification data that identifies one or more electronic documents to process;
associating the job identifier with the one or more job settings comprises associating the job identifier with the document identification data; and
sending the job settings data to the document processing device comprises sending the one or more electronic documents to the document processing device.

14. The system of claim 10, wherein:
receiving job settings data comprise receiving, from the mobile device, destination data that indicates a destination that is different than the document processing device;
associating the job identifier with the one or more job settings comprises associating the job identifier with the destination data;
the instructions, when executed by the one or more processors, further cause, after sending the job settings data to the document processing device:
receiving scanned document data from the document processing device;
identifying the destination data;
based on the destination data, sending the scanned document data to the destination.

15. The system of claim 10, wherein the job settings data includes:
the one or more job settings; or
a job settings identifier that is associated with the one or more job settings and a document processing network service that receives the job settings data uses the job settings identifier to retrieve the one or more job settings.

16. The system of claim 10, wherein receiving job settings data comprises receiving workflow data that is associated with a plurality of operations to be performed with respect to document data and a plurality of attributes that correspond to the plurality of operations.

17. The system of claim 16, wherein the workflow data includes:
   the plurality of operations and the plurality of attributes; or
   a workflow identifier and a document processing network service that receives the workflow data uses the workflow identifier to identify the plurality of operations and the plurality of attributes.

18. The system of claim 10, wherein:
   receiving job settings data from the mobile device comprises receiving contact data from the mobile device; and
   the instructions, when executed by the one or more processors, futher cause performing at least one of:
      (a) sending the contact data to the document processing device, or
      (b) receiving, from the document processing device, completion data that indicates that the document processing job is completed,
         in response to receiving the completion data, identifying one or more contacts indicated in the contact data, and
         causing a message to be sent to each contact of the one or more contacts.

19. A method comprising:
   receiving, from a mobile device, job settings data that is associated with one or more job settings for a document processing job;
   in response to receiving the job settings data:
      determining a job identifier and associating the job identifier with the one or more job settings;
      sending the job identifier to the mobile device;
   after sending the job identifier to the mobile device:
      receiving the job identifier from a document processing device that is different than the mobile device;
      identifying the one or more job settings based on the job identifier; and
      sending the one or more job settings to the document processing device;
   wherein the document processing device processes one or more documents based on the job settings data;
   wherein the method is performed by one or more computing devices that are different than the mobile device and the document processing device.

20. The method of claim 19, wherein:
   receiving job settings data comprises receiving, from the mobile device, document identification data that identifies one or more electronic documents to process;
   associating the job identifier with the one or more job settings comprises associating the job identifier with the document identification data; and
   sending the job settings data to the document processing device comprises sending the one or more electronic documents to the document processing device.

* * * * *